United States Patent
Huang

(10) Patent No.: US 11,747,833 B2
(45) Date of Patent: Sep. 5, 2023

(54) METHOD AND DEVICE FOR ESTIMATING DISTANCE TO TARGET, AND UNMANNED AERIAL VEHICLE

(71) Applicant: AUTEL ROBOTICS CO., LTD., Guangdong (CN)

(72) Inventor: Jinxin Huang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 188 days.

(21) Appl. No.: 17/356,656

(22) Filed: Jun. 24, 2021

(65) Prior Publication Data

US 2021/0325912 A1   Oct. 21, 2021

Related U.S. Application Data

(63) Continuation of application No. PCT/CN2019/128058, filed on Dec. 24, 2019.

(30) Foreign Application Priority Data

Dec. 24, 2018 (CN) .......................... 201811580979.9

(51) Int. Cl.
   *G05D 1/12*   (2006.01)
   *B64C 39/02*   (2023.01)
   (Continued)

(52) U.S. Cl.
   CPC ............. *G05D 1/12* (2013.01); *B64C 39/024* (2013.01); *B64D 47/08* (2013.01); *G01C 21/16* (2013.01);
   (Continued)

(58) Field of Classification Search
   CPC ...... G05D 1/12; G05D 1/0094; G05D 1/0808; G06V 20/46; G06V 2201/07; H04N 23/69;
   (Continued)

(56) References Cited

U.S. PATENT DOCUMENTS 9,342,746 B1 *   5/2016   Ganguli ............... G06V 10/255

FOREIGN PATENT DOCUMENTS

| CN | 103075998 A | 5/2013 |
| CN | 103604427 A | 2/2014 |

(Continued)

OTHER PUBLICATIONS

Machine Translation of KR 101614654 B1 (Year: 2016).*
(Continued)

*Primary Examiner* — Navid Z. Mehdizadeh
*Assistant Examiner* — Kenneth M Dunne

(57) ABSTRACT

The present invention relates to a method and device for estimating a distance to a target, and a unmanned aerial vehicle. The method is applicable to a unmanned aerial vehicle including a photographing device. The method includes: acquiring a current frame of image of the target captured by the photographing device; acquiring location information of the target according to the current frame of image, where the location information includes a height of the target and two-dimensional pixel coordinates of the target in the image; acquiring attitude information of the photographing device, where the attitude information includes a pitch angle of the photographing device; and acquiring a distance between the target and the unmanned aerial vehicle according to the location information of the target and the attitude information of the photographing device.

27 Claims, 3 Drawing Sheets

(51) Int. Cl.
| | |
|---|---|
| *B64D 47/08* | (2006.01) |
| *G05D 1/00* | (2006.01) |
| *G05D 1/08* | (2006.01) |
| *G06V 20/40* | (2022.01) |
| *G01C 21/16* | (2006.01) |
| *H04N 23/69* | (2023.01) |
| *H04N 23/695* | (2023.01) |
| *B64U 101/30* | (2023.01) |

(52) U.S. Cl.
CPC ......... *G05D 1/0094* (2013.01); *G05D 1/0808* (2013.01); *G06V 20/46* (2022.01); *H04N 23/69* (2023.01); *H04N 23/695* (2023.01); *B64U 2101/30* (2023.01); *B64U 2201/10* (2023.01); *G06V 2201/07* (2022.01)

(58) Field of Classification Search
CPC .... H04N 23/695; B64C 39/024; B64D 47/08; G01C 21/16; B64U 2201/10; B64U 2101/30

See application file for complete search history.

(56) References Cited

FOREIGN PATENT DOCUMENTS

| | | | |
|---|---|---|---|
| CN | 105698762 A | 6/2016 | |
| CN | 106054929 A | 10/2016 | |
| CN | 106326892 A | 1/2017 | |
| CN | 107209854 A | 9/2017 | |
| CN | 107452037 A | 12/2017 | |
| CN | 107729808 A | 2/2018 | |
| CN | 108107920 A | 6/2018 | |
| CN | 108476288 A | 8/2018 | |
| CN | 109754420 A | 5/2019 | |
| KR | 101614654 B1 * | 4/2016 | ........... G06T 7/0042 |

OTHER PUBLICATIONS

The Extended European Search Report dated Jan. 25, 2022; Appln. No. 19905518.7.

Emil Gottleben; "Master of Science Thesis in Automatic Control Vision based control of an autonomous UAV", Jan. 1, 2015; XP055878849.

Yu-Min Chiang et al; "Driver Assistance System Based on Monocular Vision", Pattern Recognition: 5th Asian Conference, ACPR 2019, Auckland, New Zealand, Nov. 26-29, 2019; Revised Selected Papers, Part II, vol. 5027, Jan. 1, 2008, pp. 1-10, XP055878791.

The International Search Report dated Mar. 26, 2020; PCT/CN2019/128058.

The First Chinese Office Action dated Jun. 4, 2020; Appln. No. 201811580979.9.

* cited by examiner

METHOD AND DEVICE FOR ESTIMATING DISTANCE TO TARGET, AND UNMANNED AERIAL VEHICLE

CROSS REFERENCE

The present application is a continuation of the International Application No. PCT/CN2019/128058, filed on Dec. 24, 2019, which claims priority of Chinese patent No. 2018115809799, filed on Dec. 24, 2018, both of which are hereby incorporated by reference in their entireties.

BACKGROUND

Technical Field

The present invention relates to the field of unmanned aerial vehicles, and more specifically, to a method and device for estimating a distance to a target, and a unmanned aerial vehicle.

Related Art

A unmanned aerial vehicle-based intelligent following function is roughly divided into two parts, namely, target detection and following control.

Generally, the target detection on a unmanned aerial vehicle is realized by a gimbal-mounted camera equipped on the unmanned aerial vehicle. For the target detection part, a target to be followed is found in an image obtained by the camera, and is marked with a rectangular frame (or other forms). The following control part is to enable the unmanned aerial vehicle to follow the target while certain requirements are met (for example, the distance between the target and the unmanned aerial vehicle is kept unchanged). The easiest way to implement following control is to follow the target according to the three-dimensional spatial location of the target. However, because the gimbal-mounted camera is a monocular camera, the three-dimensional spatial location of the target to be followed cannot be directly obtained from the camera.

At present, to solve this problem, one method is to calculate the distance between the target and the unmanned aerial vehicle according to a height above ground level obtained by the unmanned aerial vehicle. This method relies on the accuracy of the height, but the height data is unstable, which tends to cause an increasingly larger deviation in the calculated distance. In addition, this method is based on a strong assumption that the ground is level all the time. However, in fact, there are ups and downs on the ground, which will directly void this method.

Another method is to estimate the location of the target by triangulation. This method requires the unmanned aerial vehicle to have a displacement. If the unmanned aerial vehicle is hovering, the distance between the target and the unmanned aerial vehicle cannot be estimated.

SUMMARY

A technical problem to be solved by the present invention is to overcome the defects of the prior art and provide a method and device for estimating a distance to a target, and a unmanned aerial vehicle.

A technical solution adopted in the present invention to solve the technical problem is to devise a method for estimating a distance to a target, applicable to a unmanned aerial vehicle including a photographing device, the method including:

acquiring a current frame of image of the target captured by the photographing device;

acquiring location information of the target according to the current frame of image, where the location information includes a height of the target and two-dimensional pixel coordinates of the target in the image;

acquiring attitude information of the photographing device, where the attitude information includes a pitch angle of the photographing device; and acquiring a distance between the target and the unmanned aerial vehicle according to the location information of the target and the attitude information of the photographing device.

In an embodiment, the acquiring a distance between the target and the unmanned aerial vehicle according to the location information of the target and the attitude information of the photographing device includes:

acquiring a smallest circumscribed rectangle of the target, where the two-dimensional pixel coordinates of the target in the image are two-dimensional pixel coordinates of the smallest circumscribed rectangle in the image, and the two-dimensional pixel coordinates of the smallest circumscribed rectangle in the image include an ordinate $v_{min}$ of a highest point of the smallest circumscribed rectangle and an ordinate $v_{max}$ of a lowest point of the smallest circumscribed rectangle;

acquiring an angle $\varphi$ formed by a line connecting the highest point of the smallest circumscribed rectangle and the photographing device and a line connecting the lowest point of the smallest circumscribed rectangle and the photographing device;

acquiring a distance d between the target and the unmanned aerial vehicle according to the angle $\varphi$ and a pitch angle $\theta$ of the photographing device.

In an embodiment, the acquiring an angle $\varphi$ formed by a line connecting the highest point of the smallest circumscribed rectangle and the photographing device and a line connecting the lowest point of the smallest circumscribed rectangle and the photographing device includes:

acquiring an angle $\alpha$ formed by the line connecting the highest point of the smallest circumscribed rectangle and the photographing device and an optical axis of the photographing device;

acquiring an angle $\beta$ formed by the line connecting the lowest point of the smallest circumscribed rectangle and the photographing device and the optical axis of the photographing device; and calculating the angle $\varphi$ using the following formula:

$$\varphi = \beta - \alpha.$$

In an embodiment, the acquiring an angle formed by the line connecting the highest point of the smallest circumscribed rectangle and the photographing device and an optical axis of the photographing device includes:

calculating the angle $\alpha$ using the following formula:

$$\alpha = \tan^{-1} (v_{min} - c_y)/f_y;$$

where $v_{min}$ is the ordinate of the highest point of the smallest circumscribed rectangle, $c_y$ is an ordinate of an optical center of the photographing device, and $f_y$ is a focal length of the photographing device in a y-axis direction; and In an embodiment, the acquiring an angle $\beta$ formed by the line connecting the lowest point of the smallest circumscribed rectangle and the photographing device and an optical axis of the photographing device includes:

calculating the angle β using the following formula:

$$\beta=\tan^{-1}(v_{max}-c_y)/f_y;$$

where $v_{max}$ is the ordinate of the lowest point of the smallest circumscribed rectangle, $c_y$ is an ordinate of an optical center of the photographing device, and $f_y$ is a focal length of the photographing device in the y-axis direction; and In an embodiment, the acquiring a distance d between the target and the unmanned aerial vehicle according to the angle φ and a pitch angle θ of the photographing device includes:

acquiring an angle δ formed by the line connecting the lowest point of the smallest circumscribed rectangle and the photographing device and a vertical direction according to the pitch angle θ of the photographing device; and acquiring the distance d between the target and the unmanned aerial vehicle according to the angle φ and the angle δ.

In an embodiment, the acquiring an angle δ formed by the line connecting the lowest point of the smallest circumscribed rectangle and the photographing device and a vertical direction according to the pitch angle θ of the photographing device includes:

calculating the angle δ using the following formula:

$$\delta = \frac{\pi}{2} - \theta - \beta.$$

In an embodiment, the acquiring the distance d between the target and the unmanned aerial vehicle according to the angle φ and the angle δ includes:

calculating the distance d between the target and the unmanned aerial vehicle using the following formula:

$$d = L_2 \sin \delta;$$

where $L_2$ is a length of the line connecting the lowest point of the smallest circumscribed rectangle and the photographing device.

In an embodiment, the length $L_2$ of the line connecting the lowest point of the smallest circumscribed rectangle and the photographing device is calculated using the following formula:

$$L_1^2 + L_2^2 - 2L_1L_2 \cos \varphi = L^2;$$

$$L \cos \delta + L_1 \cos \varphi = L_2;$$

where $L_1$ is a length of the line connecting the highest point of the smallest circumscribed rectangle and the photographing device, and L is the height of the target.

In an embodiment, the photographing device includes a monocular camera.

The present invention further provides a device for estimating a distance to a target, applicable to a unmanned aerial vehicle, the device including:

an image acquisition unit, configured to acquire a current frame of image of the target;

a location information acquisition unit, configured to acquire location information of the target according to the current frame of image, where the location information includes a height of the target and two-dimensional pixel coordinates of the target in the image;

an attitude information acquisition unit, configured to acquire attitude information of a photographing device of the unmanned aerial vehicle, where the attitude information includes a pitch angle of the photographing device; and a distance determining unit, configured to acquire a distance d between the target and the unmanned aerial vehicle according to the location information of the target and the attitude information of the photographing device.

In an embodiment, the distance determining unit is further configured to:

acquire a smallest circumscribed rectangle of the target, where the two-dimensional pixel coordinates of the target in the image are two-dimensional pixel coordinates of the smallest circumscribed rectangle in the image, and the two-dimensional pixel coordinates of the smallest circumscribed rectangle in the image include an ordinate $v_{min}$ of a highest point of the smallest circumscribed rectangle and an ordinate $v_{max}$ of a lowest point of the smallest circumscribed rectangle;

acquire an angle φ formed by a line connecting the highest point of the smallest circumscribed rectangle and the photographing device and a line connecting the lowest point of the smallest circumscribed rectangle and the photographing device; and acquire a distance d between the target and the unmanned aerial vehicle according to the angle φ and a pitch angle θ of the photographing device.

In an embodiment, the distance determining unit is further configured to:

acquire an angle α formed by the line connecting the highest point of the smallest circumscribed rectangle and the photographing device and an optical axis of the photographing device;

acquire an angle β formed by the line connecting the lowest point of the smallest circumscribed rectangle and the photographing device and the optical axis of the photographing device; and calculate the angle φ using the following formula:

$$\varphi = \beta - \alpha.$$

In an embodiment, the distance determining unit is further configured to: calculate the angle α using the following formula:

$$\alpha = \tan^{-1}(v_{min}-c_y)/f_y;$$

where $v_{min}$ is the ordinate of the highest point of the smallest circumscribed rectangle, $c_y$ is an ordinate of an optical center of the photographing device, and $f_y$ is a focal length of the photographing device in a y-axis direction.

In an embodiment, the distance determining unit is further configured to:

calculate the angle β using the following formula:

$$\beta = \tan^{-1}(v_{max}-c_y)/f_y;$$

where $v_{max}$ is the ordinate of the lowest point of the smallest circumscribed rectangle, $c_y$ is an ordinate of an optical center of the photographing device, and $f_y$ is a focal length of the photographing device in the y-axis direction; and In an embodiment, the distance determining unit is further configured to:

acquire an angle δ formed by the line connecting the lowest point of the smallest circumscribed rectangle and the photographing device and a vertical direction according to the pitch angle θ of the photographing device; and acquire the distance d between the target and the unmanned aerial vehicle according to the angle φ and the angle δ.

In an embodiment, the distance determining unit is further configured to:
calculate the angle δ using the following formula:

$$\delta = \frac{\pi}{2} - \theta - \beta.$$

In an embodiment, the distance determining unit is further configured to:
calculate the distance d between the target and the unmanned aerial vehicle using the following formula:

$$d = L_2 \sin \delta;$$

where $L_2$ is a length of the line connecting the lowest point of the smallest circumscribed rectangle and the photographing device.

In an embodiment, the length $L_2$ of the line connecting the lowest point of the smallest circumscribed rectangle and the photographing device is calculated using the following formula:

$$L_1^2 + L_2^2 - 2L_1L_2 \cos \varphi = L^2;$$

$$L \cos \delta + L_1 \cos \varphi = L_2;$$

where $L_1$ is a length of the line connecting the highest point of the smallest circumscribed rectangle and the photographing device, and L is the height of the target.

In an embodiment, the photographing device includes a monocular camera.

The present invention further provides a unmanned aerial vehicle, including:
a body;
an arm, connected to the body;
a power device, disposed on the arm and configured to supply power for flight of the unmanned aerial vehicle;
a photographing device, disposed on the body and configured to acquire a current frame of image of a target;
an inertial measurement unit, configured to acquire attitude information of the photographing device, where the attitude information includes a pitch angle of the photographing device; and
a vision chip, disposed on the body and electrically connected to the inertial measurement unit,
where the vision chip is configured to:
acquire location information of the target according to the current frame of image, where the location information includes a height of the target and two-dimensional pixel coordinates of the target in the image; and
acquire a distance between the target and the unmanned aerial vehicle according to the location information of the target and the attitude information of the photographing device.

In an embodiment, the vision chip is further configured to:
acquire a smallest circumscribed rectangle of the target, where the two-dimensional pixel coordinates of the target in the image are two-dimensional pixel coordinates of the smallest circumscribed rectangle in the image, and the two-dimensional pixel coordinates of the smallest circumscribed rectangle in the image include an ordinate $v_{min}$ of a highest point of the smallest circumscribed rectangle and an ordinate $v_{max}$ of a lowest point of the smallest circumscribed rectangle;
acquire an angle φ formed by a line connecting the highest point of the smallest circumscribed rectangle and the photographing device and a line connecting the lowest point of the smallest circumscribed rectangle and the photographing device; and acquire a distance d between the target and the unmanned aerial vehicle according to the angle φ and a pitch angle θ of the photographing device.

In an embodiment, the vision chip is further configured to:
acquire an angle α formed by the line connecting the highest point of the smallest circumscribed rectangle and the photographing device and an optical axis of the photographing device;
acquire an angle β formed by the line connecting the lowest point of the smallest circumscribed rectangle and the photographing device and the optical axis of the photographing device; and
calculate the angle φ using the following formula:

$$\varphi = \beta - \alpha.$$

In an embodiment, the vision chip is further configured to:
calculate the angle α using the following formula:

$$\alpha = \tan^{-1}(v_{min} - c_y)/f_y;$$

where $v_{min}$ is the ordinate of the highest point of the smallest circumscribed rectangle, $c_y$ is an ordinate of an optical center of the photographing device, and $f_y$ is a focal length of the photographing device in a y-axis direction.

In an embodiment, the vision chip is further configured to:
calculate the angle β using the following formula:

$$\beta = \tan^{-1}(v_{max} - c_y)/f_y;$$

where $v_{max}$ is the ordinate of the lowest point of the smallest circumscribed rectangle, $c_y$ is an ordinate of an optical center of the photographing device, and $f_y$ is a focal length of the photographing device in the y-axis direction; and In an embodiment, the vision chip is further configured to:
acquire an angle δ formed by the line connecting the lowest point of the smallest circumscribed rectangle and the photographing device and a vertical direction according to the pitch angle θ of the photographing device; and
acquire the distance d between the target and the unmanned aerial vehicle according to the angle φ and the angle δ.

In an embodiment, the vision chip is further configured to:
calculate the angle δ using the following formula:

$$\delta = \frac{\pi}{2} - \theta - \beta.$$

In an embodiment, the vision chip is further configured to:
calculate the distance d between the target and the unmanned aerial vehicle using the following formula:

$$d = L_2 \sin \delta;$$

where $L_2$ is a length of the line connecting the lowest point of the smallest circumscribed rectangle and the photographing device.

In an embodiment, the length $L_2$ of the line connecting the lowest point of the smallest circumscribed rectangle and the photographing device is calculated using the following formula:

$$L_1^2 + L_2^2 - 2L_1L_2 \cos \varphi = L^2;$$

$$L \cos \delta + L_1 \cos \varphi = L_2;$$

where $L_1$ is a length of the line connecting the highest point of the smallest circumscribed rectangle and the photographing device, and L is the height of the target.

In an embodiment, the photographing device includes a monocular camera.

The following beneficial effects are achieved by implementing the present invention: each frame of image of the target is obtained using an image acquisition device, each frame of image is processed using a preset method to obtain motion information of the target at a moment corresponding to each frame, and computation is performed according to the motion information and equipment information of the image acquisition device at this time to finally obtain real-time spatial location information of the target in each frame, and the unmanned aerial vehicle is controlled according to the real-time spatial location information of the target in each frame, to track the target. The method of the present invention can accurately calculate the spatial location information of the target, is not based on a strong assumption, requires a small amount of calculation, can estimate the spatial location information of the target in real time, and has high accuracy.

BRIEF DESCRIPTION OF THE DRAWINGS

The present invention is further described below with reference to the accompanying drawings and embodiments. In the accompanying drawings.

DETAILED DESCRIPTION

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative effects shall fall within the protection scope of the present invention.

To solve the problem in the prior art that limited by conditions of a method used, three-dimensional spatial location information of the target that is estimated by a unmanned aerial vehicle may become invalid or the unmanned aerial vehicle cannot estimate or cannot accurately estimate the three-dimensional spatial information of the target, the embodiments of the present invention provide a method for estimating a distance to a target. This method can accurately estimate the distance between the target and the unmanned aerial vehicle, does not rely on the assumption that the ground is level, is not based on a strong assumption, requires a small amount of calculation, and can estimate the three-dimensional spatial location information of the target in real time with high accuracy, thereby ensuring the unmanned aerial vehicle can achieve accurate tracking according to the estimated three-dimensional spatial location information, or ensuring that the unmanned aerial vehicle can achieve autonomous obstacle avoidance control according to the estimated three-dimensional spatial location information.

Figure 1:
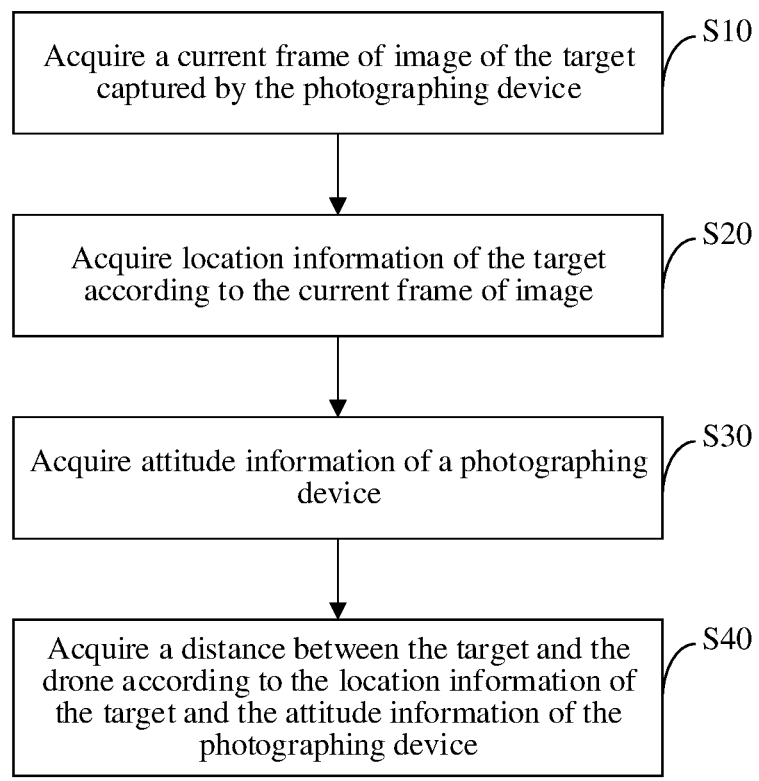
FIG. 1 is a schematic flowchart of a method for estimating a distance to a target according to an embodiment of the present invention.

Referring to FIG. 1, an embodiment of the present invention provides a method for estimating a distance to a target. This method may be used by a unmanned aerial vehicle to acquire a distance between the target and the unmanned aerial vehicle in real time, and implement real-time tracking of the target according to the acquired distance. The target may be a moving target or a stationary target, and in the real-time tracking process, the motion status (moving or stationary) of the target does not affect the accuracy of the calculation result. In addition, obstacle avoidance may also be performed according to the acquired distance between the target and the unmanned aerial vehicle.

FIG. 1 is a schematic flowchart of a method for estimating a distance to a target according to an embodiment of the present invention. The method for estimating a distance to a target may be applicable to a unmanned aerial vehicle including a photographing device. The method may specifically include the following steps:

Step S10: Acquire a current frame of image of the target captured by the photographing device.

In an embodiment of the present invention, the photographing device may be a gimbal equipped on the unmanned aerial vehicle and a camera mounted on the gimbal. The camera includes, but is not limited to, a monocular camera.

Before the unmanned aerial vehicle starts to perform target tracking control or obstacle avoidance control, the photographing device is first used to perform real-time photographing to obtain an image sequence including the target, and send the obtained image sequence to the unmanned aerial vehicle in real time. The image sequence includes all frames of images captured by the photographing device.

Step S20: Acquire location information of the target according to the current frame of image.

The location information of the target includes a height of the target and two-dimensional pixel coordinates of the target in the current frame of image.

Step S30: Acquire attitude information of a photographing device.

The attitude information of the photographing device includes a pitch angle of the photographing device.

Step S40: Acquire a distance between the target and the unmanned aerial vehicle according to the location information of the target and the attitude information of the photographing device.

Figure 2:
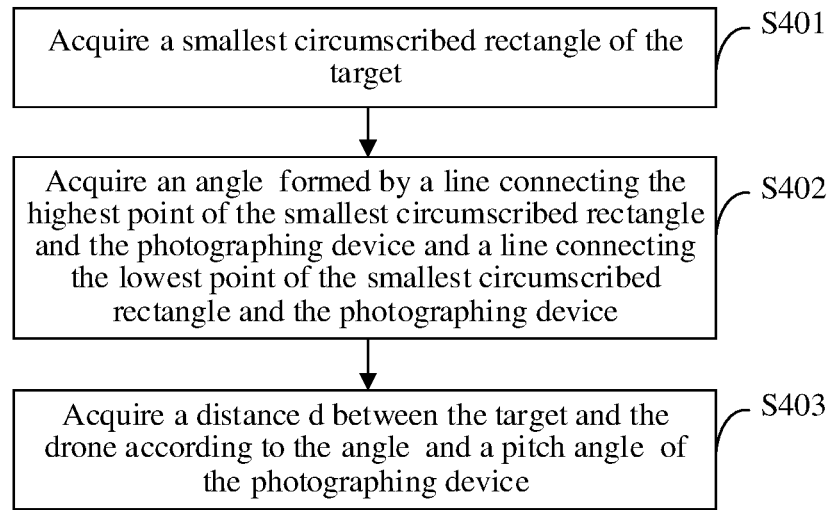
FIG. 2 is a detailed schematic flowchart of a method for estimating a distance to a target according to an embodiment of the present invention.

Specifically, as shown in FIG. 2, the distance d between the target and the unmanned aerial vehicle may be obtained through the following steps:

In other words, in an embodiment of the present invention, step S40 includes:

Step S401: Acquire a smallest circumscribed rectangle of the target.

In an embodiment of the present invention, the smallest circumscribed rectangle of the target may be a smallest circumscribed rectangular area including the target.

Figure 3:
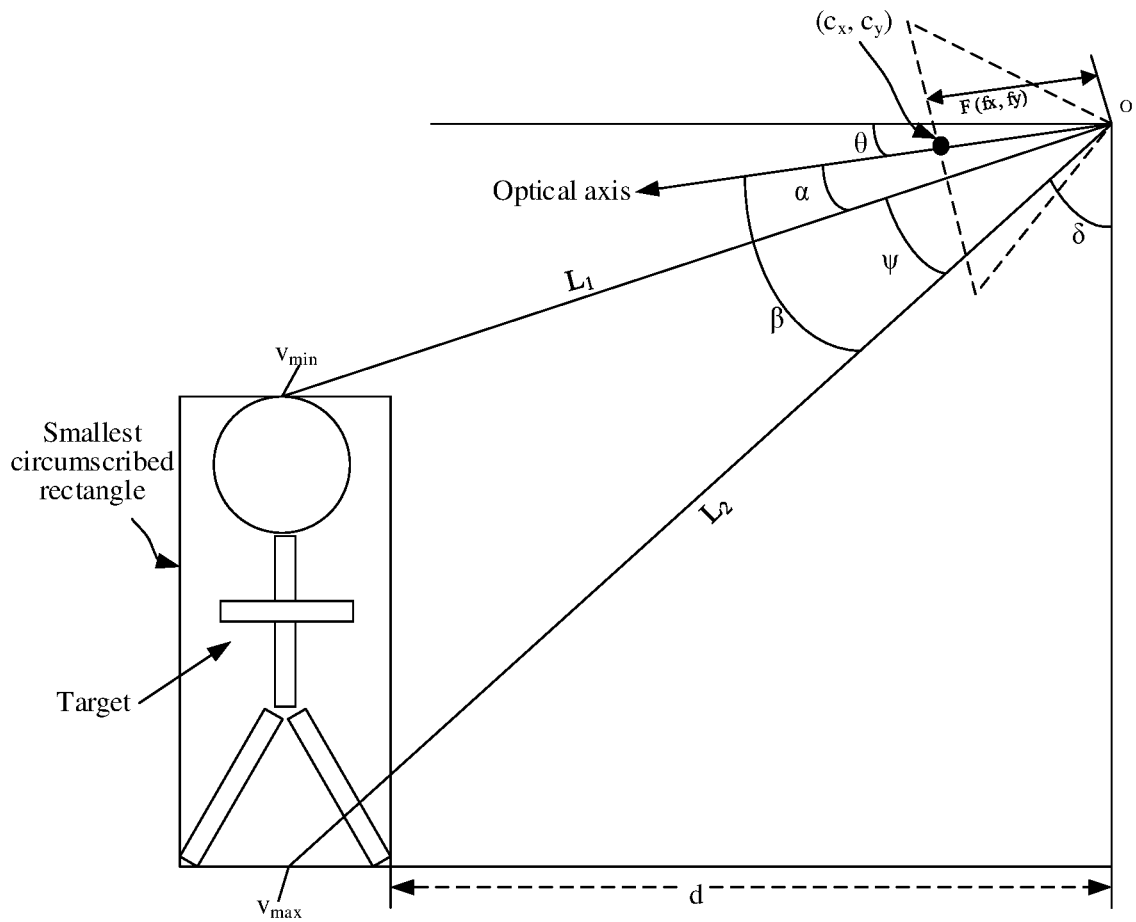
FIG. 3 is a schematic diagram of a spatial location of a target according to an embodiment of the present invention.

The two-dimensional pixel coordinates of the target in the current frame of image are two-dimensional pixel coordinates of the smallest circumscribed rectangle in the image, and the two-dimensional pixel coordinates of the smallest circumscribed rectangle in the image include an ordinate $v_{min}$ of a highest point of the smallest circumscribed rectangle and an ordinate $v_{max}$ of a lowest point of the smallest circumscribed rectangle. Specifically, as shown in FIG. 3:

Step S402: Acquire an angle φ formed by a line connecting the highest point of the smallest circumscribed rectangle and the photographing device and a line connecting the lowest point of the smallest circumscribed rectangle and the photographing device.

Specifically, in this step, first, an angle α formed by the line connecting the lowest point of the smallest circumscribed rectangle and the photographing device and the optical axis of the photographing device is acquired; next, an angle β formed by the line connecting the lowest point of the smallest circumscribed rectangle and the photographing device and the optical axis of the photographing device is acquired. Then, the angle φ formed by the line connecting the highest point of the smallest circumscribed rectangle and the photographing device and the line connecting the lowest point of the smallest circumscribed rectangle and the photographing device is calculated according to the obtained angle α and angle β.

The angle φ may be calculated using the following formula:

$$\varphi = \beta - \alpha.$$

In an embodiment of the present invention, the angle α may be calculated using the following formula:

$$\alpha = \tan^{-1}(v_{min} - c_y)/f_y.$$

where $v_{min}$ is the ordinate of the highest point of the smallest circumscribed rectangle, $c_y$ is an ordinate of an optical center of the photographing device, and $f_y$ is a focal length of the photographing device in a y-axis direction.

In an embodiment of the present invention, the angle β may be calculated using the following formula:

$$\beta = \tan^{-1}(v_{max} - c_y)/f_y.$$

where $v_{max}$ is the ordinate of the lowest point of the smallest circumscribed rectangle, $c_x$ is an ordinate of an optical center of the photographing device, and $f_y$ is a focal length of the photographing device in the y-axis direction.

Step S403: Acquire a distance d between the target and the unmanned aerial vehicle according to the angle φ and a pitch angle θ of the photographing device.

In an embodiment of the present invention, step S403 may include the following steps:

Step S4031: Acquire an angle δ formed by the line connecting the lowest point of the smallest circumscribed rectangle and the photographing device and a vertical direction according to the pitch angle θ of the photographing device.

In an embodiment of the present invention, the angle δ may be calculated using the following formula:

$$\delta = \frac{\pi}{2} - \theta - \beta.$$

Step S4032: Acquire the distance d between the target and the unmanned aerial vehicle according to the angle φ and the angle δ.

In an embodiment of the present invention, the distance d between the target and the unmanned aerial vehicle may be calculated using the following formula:

$$d = L_2 \sin \delta.$$

where $L_2$ is a length of the line connecting the lowest point of the smallest circumscribed rectangle and the photographing device. Refer to FIG. 3.

Further, the length $L_2$ of the line connecting the lowest point of the smallest circumscribed rectangle and the photographing device is calculated using the following formula:

$$L_1^2 + L_2^2 - 2L_1 L_2 \cos \varphi = L^2;$$

$$L \cos \delta + L_1 \cos \varphi = L_2; \text{ and}$$

where $L_1$ is a length of the line connecting the highest point of the smallest circumscribed rectangle and the photographing device, and L is the height of the target. Refer to FIG. 3.

Specifically, after the distance d between the target and the unmanned aerial vehicle is acquired in step S40, the unmanned aerial vehicle may be controlled to track the target according to the distance. Of course, it is understandable that in some other embodiments, autonomous obstacle avoidance control may also be performed according to the distance.

It should be noted herein that in the embodiments of the present invention, for each frame of image received, the distance between the target and the unmanned aerial vehicle in each frame is obtained by performing the above steps S10 to S40, and tracking control or obstacle avoidance control is performed according to the distance obtained for each frame, so that the unmanned aerial vehicle can implement the real-time acquisition of the location of the target, tracking of the target, autonomous obstacle avoidance control, and so on.

By implementing the method for estimating a distance to a target according to the present invention, the problem that it is difficult to acquire three-dimensional spatial location information of the target using a monocular camera is effectively solved. In addition, the present invention does not rely on the assumption that the ground is level, is not based on any other strong assumption, requires a small amount of calculation, and can estimate the three-dimensional spatial location information of the target in real time. Moreover, the motion status of the target and the displacement status of the unmanned aerial vehicle do not affect the implementation of the present invention. In other words, regardless of whether the target is in a moving or stationary state, the present invention can accurately estimate the three-dimensional spatial location information of the target; when the unmanned aerial vehicle has no displacement, i.e., when the unmanned aerial vehicle is hovering, the present invention can accurately estimate the distance between the target and the unmanned aerial vehicle, and therefore can accurately acquire the three-dimensional spatial location information of the target.

Figure 4:
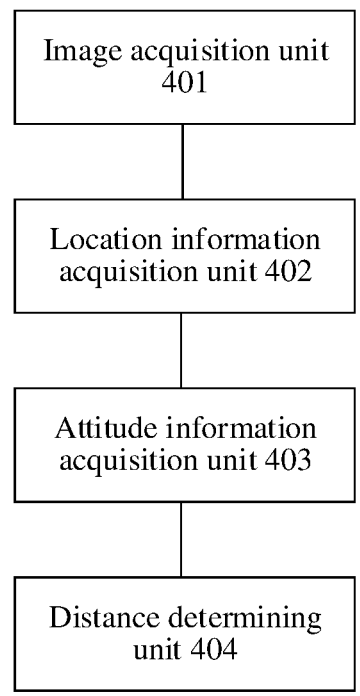
FIG. 4 is a functional block diagram of a device for estimating a distance to a target according to an embodiment of the present invention.

FIG. 4 is a functional block diagram of a device for estimating a distance to a target according to an embodiment of the present invention. The device for estimating a distance to a target can be configured to implement the above method for estimating a distance to a target. The device for estimating a distance to a target according to the embodiments of the present invention may be applicable to a unmanned aerial vehicle.

As shown in FIG. 4, the device for estimating a distance to a target may include: an image acquisition unit 401, a location information acquisition unit 402, an attitude information acquisition unit 403, and a distance determining unit 404.

Specifically, the image acquisition unit 401 is configured to acquire a current frame of image of the target.

The location information acquisition unit 402 is configured to acquire location information of the target according to the current frame of image, where the location information includes a height of the target and two-dimensional pixel coordinates of the target in the image.

The attitude information acquisition unit 403 is configured to acquire attitude information of a photographing device, where the attitude information includes a pitch angle of the photographing device.

The distance determining unit 404 is configured to acquire a distance d between the target and the unmanned aerial vehicle according to the location information of the target and the attitude information of the photographing device.

Optionally, in an embodiment of the present invention, the distance determining unit 404 is further configured to:

acquire a smallest circumscribed rectangle of the target, where the two-dimensional pixel coordinates of the target in the image are two-dimensional pixel coordinates of the smallest circumscribed rectangle in the image, and the two-dimensional pixel coordinates of the smallest circumscribed rectangle in the image include an ordinate $v_{min}$ of a highest point of the smallest circumscribed rectangle and an ordinate $v_{max}$ of a lowest point of the smallest circumscribed rectangle; and acquire an angle φ formed by a line connecting the highest point of the smallest circumscribed rectangle and the photographing device and a line connecting the lowest point of the smallest circumscribed rectangle and the photographing device.

Optionally, the distance determining unit 404 is specifically configured to:

acquire an angle α formed by the line connecting the highest point of the smallest circumscribed rectangle and the photographing device and an optical axis of the photographing device;

where the angle α may be calculated using the following formula:

$$\alpha = \tan^{-1}(v_{min}-c_y)/f_y;$$

where $v_{min}$ is the ordinate of the highest point of the smallest circumscribed rectangle, $c_x$ is an abscissa of an optical center of the photographing device, and $f_y$ is a focal length of the photographing device.

The distance determining unit 404 may be further configured to: acquire an angle β formed by the line connecting the lowest point of the smallest circumscribed rectangle and the photographing device and the optical axis of the photographing device.

where the angle φ may be calculated using the following formula:

$$\varphi = \beta - \alpha.$$

The angle β is calculated using the following formula:

$$\beta = \tan^{-1}(v_{max}-c_y)/f_y;$$

where $v_{max}$ is the ordinate of the lowest point of the smallest circumscribed rectangle, $c_x$ is an abscissa of an optical center of the photographing device, and f is a focal length of the photographing device.

The distance determining unit 404 may be further configured to: acquire a distance d between the target and the unmanned aerial vehicle according to the angle φ and a pitch angle θ of the photographing device.

Optionally, in an embodiment of the present invention, the distance determining unit 404 is further configured to:

acquire an angle δ formed by the line connecting the lowest point of the smallest circumscribed rectangle and the photographing device and a vertical direction according to the pitch angle θ of the photographing device.

In an embodiment of the present invention, the angle δ may be calculated using the following formula:

$$\delta = \frac{\pi}{2} - \theta - \beta.$$

The distance determining unit 404 may be further configured to: acquire the distance d between the target and the unmanned aerial vehicle according to the angle φ and the angle δ.

In an embodiment of the present invention, the distance d between the target and the unmanned aerial vehicle is calculated using the following formula:

$$d = L_2 \sin \delta;$$

where $L_2$ is a length of the line connecting the lowest point of the smallest circumscribed rectangle and the photographing device.

Further, the length $L_2$ of the line connecting the lowest point of the smallest circumscribed rectangle and the photographing device is calculated using the following formula:

$$L_1^2 + L_2^2 - 2L_1L_2 \cos \varphi = L^2;$$

$$L \cos \delta + L_1 \cos \varphi = L_2;$$

where $L_1$ is a length of the line connecting the highest point of the smallest circumscribed rectangle and the photographing device, and L is the height of the target.

In an embodiment of the present invention, the image acquisition unit 401 may be a photographing device equipped on a unmanned aerial vehicle, where the photographing device may include a gimbal and a camera mounted on the gimbal. The camera includes, but is not limited to, a monocular camera. The location information acquisition unit 402 and the distance determining unit 404 may be a vision chip of the unmanned aerial vehicle. The attitude information acquisition unit 403 may be an inertial measurement unit (IMU) mounted on the gimbal of the unmanned aerial vehicle.

The present invention also provides a unmanned aerial vehicle. The unmanned aerial vehicle can be configured to implement the above method for estimating a distance to a target, can estimate the distance between the target and the unmanned aerial vehicle in real time, and can also track or avoid the target according to the distance between the target and the unmanned aerial vehicle that is estimated in real time.

Figure 5:
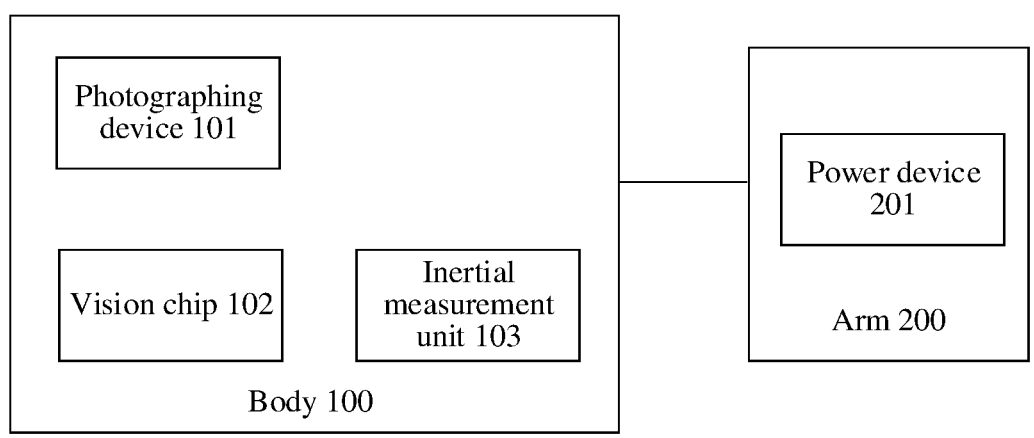
FIG. 5 is a schematic structural diagram of a unmanned aerial vehicle according to an embodiment of the present invention.

As shown in FIG. 5, the unmanned aerial vehicle provided in an implementation of the present invention includes a body 100, an arm 200 connected to the body 100, a power device 201 disposed on the arm 200, a photographing device 101 disposed on the body 100, a vision chip 102, and an inertial measurement unit 103 disposed on the photographing device 101. The vision chip 102 is electrically connected to the inertial measurement unit 103.

In an embodiment of the present invention, the power device 201 is configured to supply power for flight of the unmanned aerial vehicle. Optionally, the power device 201 may include a motor disposed on the arm 200 and a propeller connected to the motor, and the motor is configured to drive the propeller to rotate at a high speed to provide the power required for the flight of the unmanned aerial vehicle.

In an embodiment of the present invention, the photographing device 101 is configured to acquire a current frame of image of the target. Optionally, the photographing device 101 may be a gimbal-mounted camera equipped on the unmanned aerial vehicle. Specifically, the photographing device 101 may include a gimbal connected to the body 100 of the unmanned aerial vehicle and a camera connected to the gimbal. The camera includes, but is not limited to, a monocular camera.

In an embodiment of the present invention, the inertial measurement unit 103 is configured to acquire attitude information of the photographing device 101, where the attitude information includes a pitch angle of the photographing device 101. Specifically, the inertial measurement unit 103 is disposed on the gimbal.

In an embodiment of the present invention, the vision chip 102 is configured to perform the following actions:

acquiring location information of the target according to the current frame of image, where the location information includes a height of the target and two-dimensional pixel coordinates of the target in the image; and acquiring a distance between the target and the unmanned aerial vehicle according to the location information of the target and the attitude information of the photographing device 101.

Further, the vision chip 102 may specifically be configured to perform the following actions:

acquiring a smallest circumscribed rectangle of the target, where the two-dimensional pixel coordinates of the target in the image are two-dimensional pixel coordinates of the smallest circumscribed rectangle in the image, and the two-dimensional pixel coordinates of the smallest circumscribed rectangle in the image include an ordinate $v_{min}$ of a highest point of the smallest circumscribed rectangle and an ordinate $v_{max}$ of a lowest point of the smallest circumscribed rectangle; and acquiring an angle φ formed by a line connecting the highest point of the smallest circumscribed rectangle and the photographing device 101 and a line connecting the lowest point of the smallest circumscribed rectangle and the photographing device 101; and acquiring a distance d between the target and the unmanned aerial vehicle according to the angle φ and a pitch angle θ of the photographing device 101.

Further, the vision chip 102 may specifically be further configured to:

acquire an angle α formed by the line connecting the highest point of the smallest circumscribed rectangle and the photographing device 101 and an optical axis of the photographing device 101; and acquire an angle β formed by the line connecting the lowest point of the smallest circumscribed rectangle and the photographing device 101 and the optical axis of the photographing device 101.

The angle φ may be calculated using the following formula:

$$\varphi=\beta-\alpha.$$

Further, the vision chip 102 may specifically be further configured to:

calculate the angle α using the following formula:

$$\alpha=\tan^{-1}(v_{min}-c_y)/f_y;$$

where $v_{min}$ is the ordinate of the highest point of the smallest circumscribed rectangle, $c_y$ is an ordinate of an optical center of the photographing device 101, and $f_y$ is a focal length of the photographing device 101 in a y-axis direction.

Further, the vision chip 102 may specifically be further configured to:

calculate the angle β using the following formula:

$$\beta=\tan^{-1}(v_{max}-c_y)/f_y;$$

where $v_{max}$ is the ordinate of the lowest point of the smallest circumscribed rectangle, $c_y$ is an ordinate of an optical center of the photographing device 101, and $f_y$ is a focal length of the photographing device 101 in a y-axis direction.

Further, the vision chip 102 may specifically be further configured to:

acquire an angle δ formed by the line connecting the lowest point of the smallest circumscribed rectangle and the photographing device 101 and a vertical direction according to the pitch angle θ of the photographing device 101; and acquire the distance d between the target and the unmanned aerial vehicle according to the angle φ and the angle δ.

Further, the vision chip 102 may specifically be further configured to:

calculate the angle δ using the following formula:

$$\delta = \frac{\pi}{2} - \theta - \beta.$$

Further, the vision chip 102 may specifically be further configured to:

calculate the distance d between the target and the unmanned aerial vehicle using the following formula:

$$d=L_2 \sin \delta;$$

where $L_2$ is a length of the line connecting the lowest point of the smallest circumscribed rectangle and the photographing device 101.

Further, the length $L_2$ of the line connecting the lowest point of the smallest circumscribed rectangle and the photographing device 101 may be calculated using the following formula:

$$L_1^2+L_2^2-2L_1L_2 \cos \varphi=L^2;$$

$$L \cos \delta + L_1 \cos \varphi=L_2;$$

where $L_1$ is a length of the line connecting the highest point of the smallest circumscribed rectangle and the photographing device 101, and L is the height of the target.

The embodiments are only for describing the technical concepts and features of the present invention, and are intended to enable a person skilled in the art to understand the present invention and to practice the same, and are not intended to limit the scope of the present invention. All equivalent changes and modifications made without departing from the scope of the claims of the present invention shall fall within the scope of the claims of the present invention.

It is to be understood that modifications and changes can be made by those skilled in the art in accordance with the above description, which are intended to be contemplated in the protection scope of the appended claims.

What is claimed is:

1. A method for estimating a distance to a target, applicable to an unmanned aerial vehicle comprising a photographing device, the method comprising:

acquiring a current frame of image of the target captured by the photographing device;

acquiring location information of the target according to the current frame of image, wherein the location information comprises a height of the target and two-dimensional pixel coordinates of the target in the image;

acquiring attitude information of the photographing device, wherein the attitude information comprises a pitch angle of the photographing device; and acquiring a distance between the target and the unmanned aerial vehicle according to the location information of the target and the attitude information of the photographing device;

wherein, the acquiring a distance between the target and the unmanned aerial vehicle according to the location information of the target and the attitude information of the photographing device comprises:

acquiring a smallest circumscribed rectangle of the target, where the two-dimensional pixel coordinates of the target in the image are two-dimensional pixel coordinates of the smallest circumscribed rectangle in the image, and the two-dimensional pixel coordinates of the smallest circumscribed rectangle in the image comprise an ordinate $v_{min}$ of a highest point of the smallest circumscribed rectangle and an ordinate $v_{max}$ of a lowest point of the smallest circumscribed rectangle;

acquiring an angle φ formed by a line connecting the highest point of the smallest circumscribed rectangle and the photographing device and a line connecting the lowest point of the smallest circumscribed rectangle and the photographing device;

acquiring a distance d between the target and the unmanned aerial vehicle according to the angle φ and a pitch angle θ of the photographing device.

2. The method according to claim 1, wherein, the acquiring an angle φ formed by a line connecting the highest point of the smallest circumscribed rectangle and the photographing device and a line connecting the lowest point of the smallest circumscribed rectangle and the photographing device comprises:

acquiring an angle α formed by the line connecting the highest point of the smallest circumscribed rectangle and the photographing device and an optical axis of the photographing device;

acquiring an angle β formed by the line connecting the lowest point of the smallest circumscribed rectangle and the photographing device and the optical axis of the photographing device; and calculating the angle φ using the following formula:

$$\varphi = \beta - \alpha.$$

3. The method according to claim 2, wherein the acquiring an angle α formed by the line connecting the highest point of the smallest circumscribed rectangle and the photographing device and an optical axis of the photographing device comprises:

calculating the angle α using the following formula:

$$\alpha = \tan^{-1}(v_{min} - c_y)/f_y;$$

wherein $v_{min}$ is the ordinate of the highest point of the smallest circumscribed rectangle, $c_y$ is an ordinate of an optical center of the photographing device, and $f_y$ is a focal length of the photographing device in a y-axis direction.

4. The method according to claim 2, wherein, the acquiring an angle β formed by the line connecting the lowest point of the smallest circumscribed rectangle and the photographing device and the optical axis of the photographing device comprises:

calculating the angle β using the following formula:

$$\beta = \tan^{-1}(v_{max} - c_y)/f_y;$$

wherein $v_{max}$ is the ordinate of the lowest point of the smallest circumscribed rectangle, $c_y$ is an ordinate of an optical center of the photographing device, and $f_y$ is a focal length of the photographing device in the y-axis direction.

5. The method according to claim 2, wherein, the acquiring a distance d between the target and the unmanned aerial vehicle according to the angle φ and a pitch angle θ of the photographing device comprises:

acquiring an angle δ formed by the line connecting the lowest point of the smallest circumscribed rectangle and the photographing device and a vertical direction according to the pitch angle θ of the photographing device; and acquiring the distance d between the target and the unmanned aerial vehicle according to the angle φ and the angle δ.

6. The method according to claim 5, wherein, the acquiring an angle δ formed by the line connecting the lowest point of the smallest circumscribed rectangle and the photographing device and a vertical direction according to the pitch angle θ of the photographing device comprises:

calculating the angle δ using the following formula:

$$\delta = \frac{\pi}{2} - \theta - \beta.$$

7. The method according to claim 5, wherein the acquiring the distance d between the target and the unmanned aerial vehicle according to the angle φ and the angle δ comprises:

calculating the distance d between the target and the unmanned aerial vehicle using the following formula:

$$d = L_2 \sin \delta;$$

wherein $L_2$ is a length of the line connecting the lowest point of the smallest circumscribed rectangle and the photographing device.

8. The method according to claim 7, wherein the length $L_2$ of the line connecting the lowest point of the smallest circumscribed rectangle and the photographing device is calculated using the following formula:

$$L_1^2 + L_2^2 - 2L_1L_2 \cos \varphi = L^2;$$

$$L \cos \delta + L_1 \cos \varphi = L_2;$$

wherein $L_1$ is a length of the line connecting the highest point of the smallest circumscribed rectangle and the photographing device, and L is the height of the target.

9. The method according to claim 1, wherein the photographing device comprises a monocular camera.

10. A device for estimating a distance to a target, applicable to a unmanned aerial vehicle, the device comprising:

a memory, configured to store a computer executable method program for estimating the distance to the target; and a processor, configured to invoke the computer executable method program for estimating the distance to the target to:

acquire a current frame of image of the target;

acquire location information of the target according to the current frame of image, wherein the location information comprises a height of the target and two-dimensional pixel coordinates of the target in the image;

acquire attitude information of a photographing device of the unmanned aerial vehicle, wherein the attitude information comprises a pitch angle of the photographing device; and acquire a distance between the target and the unmanned aerial vehicle according to the location information of the target and the attitude information of the photographing device;

wherein the processor is further configured to:

acquire a smallest circumscribed rectangle of the target, where the two-dimensional pixel coordinates of the target in the image are two-dimensional pixel coordinates of the smallest circumscribed rectangle in the image, and the two-dimensional pixel coordinates of the smallest circumscribed rectangle in the image comprise an ordinate $v_{min}$ of a highest point of the smallest circumscribed rectangle and an ordinate $v_{max}$ of a lowest point of the smallest circumscribed rectangle;

acquire an angle φ formed by a line connecting the highest point of the smallest circumscribed rectangle and the photographing device and a line connecting the lowest point of the smallest circumscribed rectangle and the photographing device; and acquire a distanced between the target and the unmanned aerial vehicle according to the angle φ and a pitch angle θ of the photographing device.

11. The device for estimating a distance to a target according to claim 10, wherein, the processor is further configured to:

acquire an angle α formed by the line connecting the highest point of the smallest circumscribed rectangle and the photographing device and an optical axis of the photographing device;

acquire an angle β formed by the line connecting the lowest point of the smallest circumscribed rectangle and the photographing device and the optical axis of the photographing device; and calculate the angle φ using the following formula:

φ=β−α.

12. The device for estimating a distance to a target according to claim 11, wherein, the processor is further configured to:

calculate the angle α using the following formula:

$\alpha = \tan^{-1}(v_{min}-c_y)/f_y$;

wherein $v_{min}$ is the ordinate of the highest point of the smallest circumscribed rectangle, $c_y$ is an ordinate of an optical center of the photographing device, and $f_y$ is a focal length of the photographing device in a y-axis direction.

13. The device for estimating a distance to a target according to claim 11, wherein, the processor is further configured to:

calculate the angle β using the following formula:

$\beta = \tan^{-1}(v_{max}-c_y)/f_y$;

wherein $v_{max}$ is the ordinate of the lowest point of the smallest circumscribed rectangle, $c_y$ is an ordinate of an optical center of the photographing device, and $f_y$ is a focal length of the photographing device in the y-axis direction.

14. The device for estimating a distance to a target according to claim 11, wherein, the processor is further configured to:

acquire an angle δ formed by the line connecting the lowest point of the smallest circumscribed rectangle and the photographing device and a vertical direction according to the pitch angle θ of the photographing device; and acquire the distance d between the target and the unmanned aerial vehicle according to the angle φ and the angle δ.

15. The device for estimating a distance to a target according to claim 14, wherein, the processor is further configured to:

calculate the angle δ using the following formula:

$$\delta = \frac{\pi}{2} - \theta - \beta.$$

16. The device for estimating a distance to a target according to claim 14, wherein, the processor is further configured to:

calculate the distance d between the target and the unmanned aerial vehicle using the following formula:

$d = L_2 \sin \delta$;

wherein $L_2$ is a length of the line connecting the lowest point of the smallest circumscribed rectangle and the photographing device.

17. The device for estimating a distance to a target according to claim 16, wherein, the length $L_2$ of the line connecting the lowest point of the smallest circumscribed rectangle and the photographing device is calculated using the following formula:

$L_1^2 + L_2^2 - 2L_1L_2 \cos \varphi = L^2$;

$L \cos \delta + L_1 \cos \varphi = L_2$;

wherein $L_1$ is a length of the line connecting the highest point of the smallest circumscribed rectangle and the photographing device, and L is the height of the target.

18. The device for estimating a distance to a target according to claim 10, wherein, the photographing device comprises a monocular camera.

19. An unmanned aerial vehicle, comprising:

a body;

an arm, connected to the body;

a power device, disposed on the arm and configured to supply power for flight of the unmanned aerial vehicle;

a photographing device, disposed on the body and configured to acquire a current frame of image of a target;

an inertial measurement unit, configured to acquire attitude information of the photographing device, wherein the attitude information comprises a pitch angle of the photographing device; and a vision chip, disposed on the body and electrically connected to the inertial measurement unit, wherein the vision chip is configured to:

acquire location information of the target according to the current frame of image, wherein the location information comprises a height of the target and two-dimensional pixel coordinates of the target in the image; and acquire a distance between the target and the unmanned aerial vehicle according to the location information of the target and the attitude information of the photographing device;

wherein, the vision chip is further configured to:

acquire a smallest circumscribed rectangle of the target, where the two-dimensional pixel coordinates of the target in the image are two-dimensional pixel coordinates of the smallest circumscribed rectangle in the image, and the two-dimensional pixel coordinates of the smallest circumscribed rectangle in the image comprise an ordinate $v_{min}$ of a highest point of the smallest circumscribed rectangle and an ordinate $v_{max}$ of a lowest point of the smallest circumscribed rectangle;

acquire an angle φ formed by a line connecting the highest point of the smallest circumscribed rectangle and the photographing device and a line connecting the lowest point of the smallest circumscribed rectangle and the photographing device; and acquire a distance d between the target and the unmanned aerial vehicle according to the angle φ and a pitch angle θ of the photographing device.

20. The unmanned aerial vehicle according to claim 19, wherein, the vision chip is further configured to:

acquire an angle α formed by the line connecting the highest point of the smallest circumscribed rectangle and the photographing device and an optical axis of the photographing device;

acquire an angle β formed by the line connecting the lowest point of the smallest circumscribed rectangle and the photographing device and the optical axis of the photographing device; and calculate the angle φ using the following formula:

$$\varphi = \beta - \alpha.$$

21. The unmanned aerial vehicle according to claim 20, wherein the vision chip is further configured to:

calculate the angle α using the following formula:

$$\alpha = \tan^{-1}(v_{min} - c_y)/f_y;$$

wherein $v_{min}$ is the ordinate of the highest point of the smallest circumscribed rectangle, $c_y$ is an ordinate of an optical center of the photographing device, and $f_y$ is a focal length of the photographing device in a y-axis direction.

22. The unmanned aerial vehicle according to claim 20, wherein, the vision chip is further configured to:

calculate the angle β using the following formula:

$$\beta = \tan^{-1}(v_{max} - c_y)/f_y;$$

wherein $v_{max}$ is the ordinate of the lowest point of the smallest circumscribed rectangle, $c_y$ is an ordinate of an optical center of the photographing device, and $f_y$ is a focal length of the photographing device in the y-axis direction.

23. The unmanned aerial vehicle according to claim 20, wherein, the vision chip is further configured to:

acquire an angle δ formed by the line connecting the lowest point of the smallest circumscribed rectangle and the photographing device and a vertical direction according to the pitch angle θ of the photographing device; and acquire the distance d between the target and the unmanned aerial vehicle according to the angle φ and the angle δ.

24. The unmanned aerial vehicle according to claim 23, wherein, the vision chip is further configured to:

calculate the angle δ using the following formula:

$$\delta = \frac{\pi}{2} - \theta - \beta.$$

25. The unmanned aerial vehicle according to claim 23, wherein, the vision chip is further configured to:

calculate the distance d between the target and the unmanned aerial vehicle using the following formula:

$$d = L_2 \sin \delta;$$

wherein $L_2$ is a length of the line connecting the lowest point of the smallest circumscribed rectangle and the photographing device.

26. The unmanned aerial vehicle according to claim 25, wherein, the length $L_2$ of the line connecting the lowest point of the smallest circumscribed rectangle and the photographing device is calculated using the following formula:

$$L_1^2 + L_2^2 - 2L_1L_2 \cos \varphi = L^2;$$

$$L \cos \delta + L_1 \cos \varphi = L_2;$$

wherein $L_1$ is a length of the line connecting the highest point of the smallest circumscribed rectangle and the photographing device, and L is the height of the target.

27. The unmanned aerial vehicle according to claim 19, wherein, the photographing device comprises a monocular camera.

* * * * *